United States Patent [19]

Brown

[11] Patent Number: 4,481,517
[45] Date of Patent: Nov. 6, 1984

[54] ECHOMETRY DEVICE AND METHOD

[75] Inventor: Edmund H. Brown, Boulder, Colo.

[73] Assignee: The United States of America as represented by the Secretary of Commerce, Washington, D.C.

[21] Appl. No.: 261,415

[22] Filed: May 7, 1981

[51] Int. Cl.³ .............................................. G01J 9/00
[52] U.S. Cl. .............................. 343/5 NA; 343/5 W; 374/117; 73/170 R; 367/87
[58] Field of Search .......................... 343/5 W, 5 NA; 73/170 R; 374/117, 119; 367/87

[56] References Cited

U.S. PATENT DOCUMENTS

| | | | |
|---|---|---|---|
| 3,885,237 | 5/1975 | Kirkpatrick | 343/5 W |
| 4,053,886 | 10/1977 | Wright et al. | 343/5 W X |
| 4,222,265 | 9/1980 | Ravussin | 343/5 W X |
| 4,249,418 | 2/1981 | Ebata | 374/117 |

OTHER PUBLICATIONS

"Echosonde Interferometer for Atmospheric Research" Brown, Little and Wright, Journal of the Acoustical Society of America, vol. 63, No. 3, Mar. 1978, pp. 694–699.

"Advances in Atmospheric Acoustics", Brown and Hall, Reviews of Geophysics and Space Physics, vol. 16, No. 1, Feb. 1978 pp. 47–110.

"Ronsard Meteorological Radar", M. Castets, Electrical Communications, vol. 52, No. 2 (1977), pp. 146–151.

A. D. Surridge, "On a Phase Sensative Acoustic Sounder," Journal of Atmospheric and Terrestrial Physics, vol. 40, pp. 105–110, (1978).

A. D. Surridge, "Temperature Profile in the Lower Atmosphere obtained by Acoustic Sounding", paper presented at 1974 Nelcon Conference at Auckland, New Zealand, Aug. 1974.

Closs & Surridge, "The Temperature Profile in the Lower Atmosphere", Journal of Physics E: Scientific Instruments, vol. 7 (1974).

Primary Examiner—Maynard R. Wilbur
Assistant Examiner—K. R. Kaiser
Attorney, Agent, or Firm—Eugene J. Pawlikowski; Alvin J. Englert; Robert E. Harris

[57] ABSTRACT

Devices and methods are disclosed for remote measurment of temperature (and velocity) profiles in a fluid medium (i.e., the atmosphere and/or oceans). Each device, herein called an echometer, and method are capable of providing remote measurements of temperature through the use of propagated waves (i.e., acoustic or electromagnetic waves) and interferometric principles. By use of Doppler processing, simultaneous measurement can be made of three-dimensional velocities at the same points in space to enable remote measurement of heat fluxes in the atmosphere or ocean. The waves to be propagated are formed and then transmitted from a transmitting array to form a pattern of constructive interference fringes and reflected (or scattered) waves are received from predetermined points in the constructive interference fringes at a receiver where an analog signal indicative of the reflected waves is formed and the mean phase thereof sampled to form a digital signal that is processed to determine therefrom temperature changes or absolute temperature measurements at predetermined points spaced from the transmitting array and receiver.

36 Claims, 12 Drawing Figures

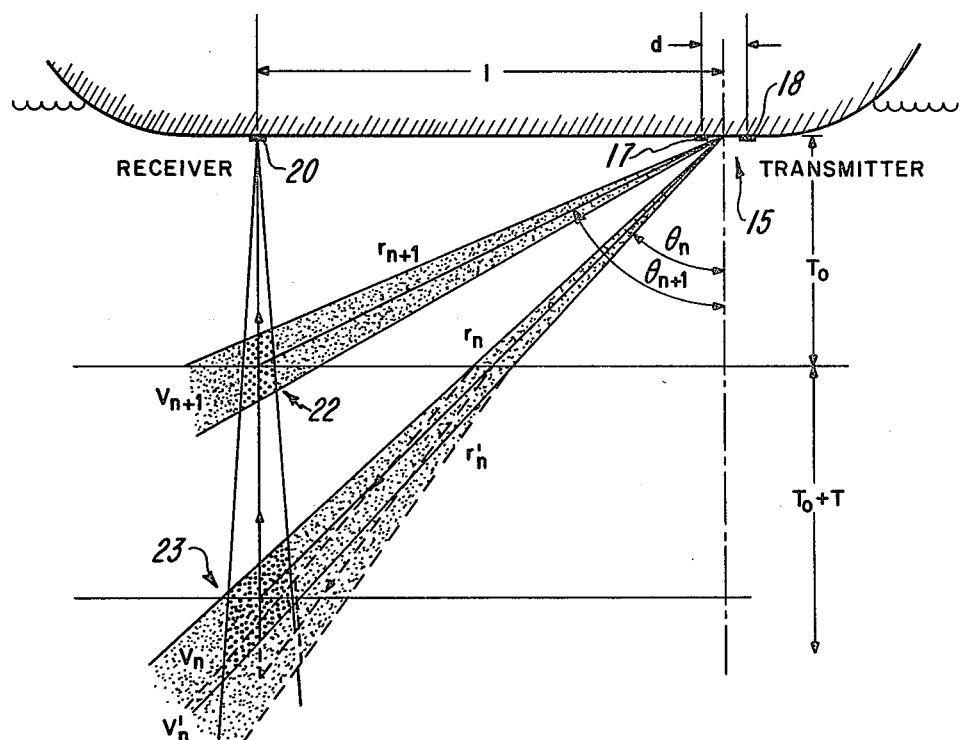
Fig_1
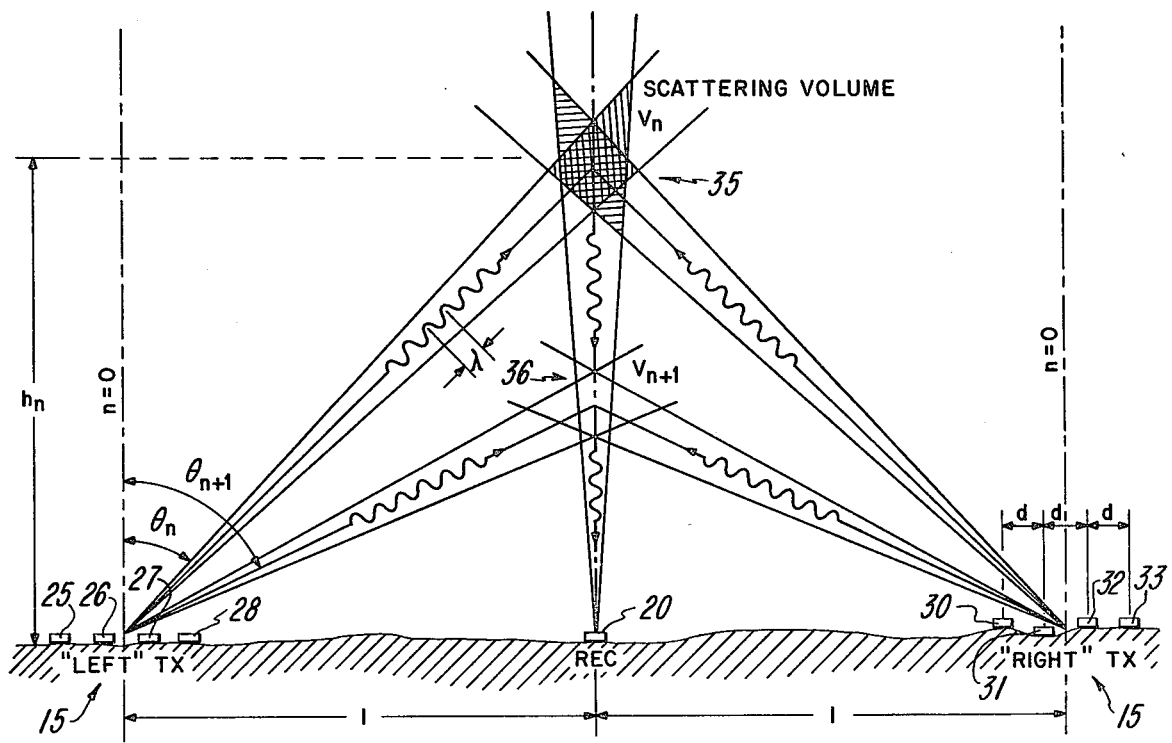
Fig_2

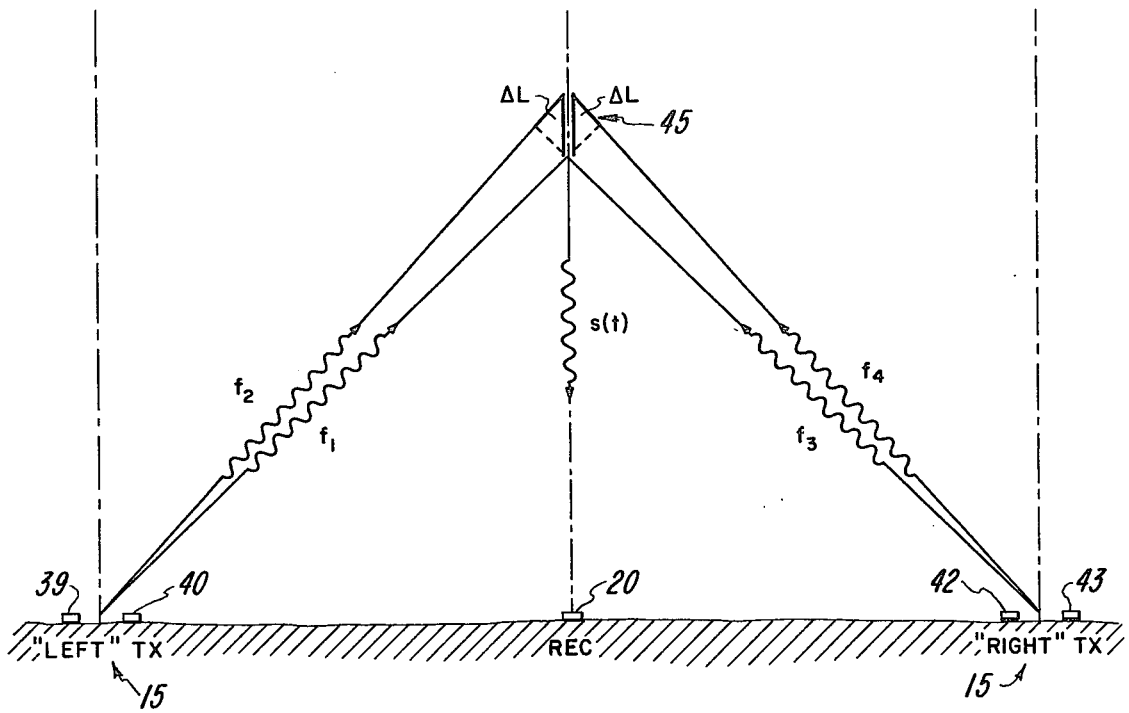
Fig_3
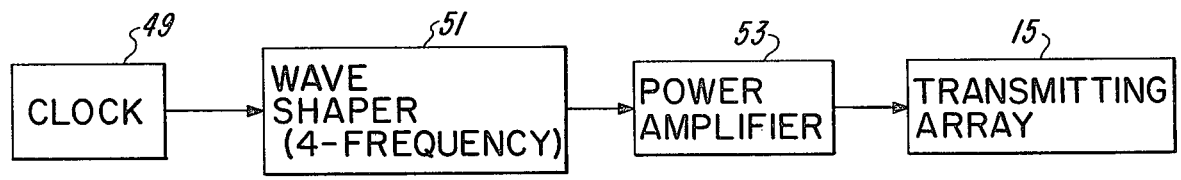
Fig_4

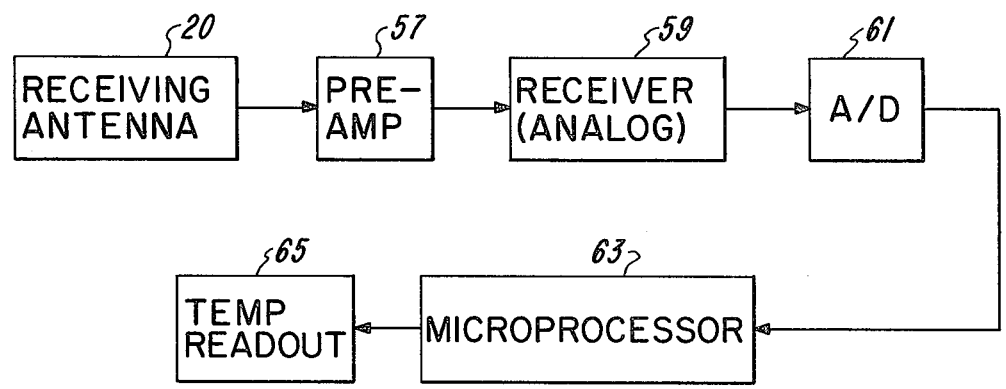
Fig_5
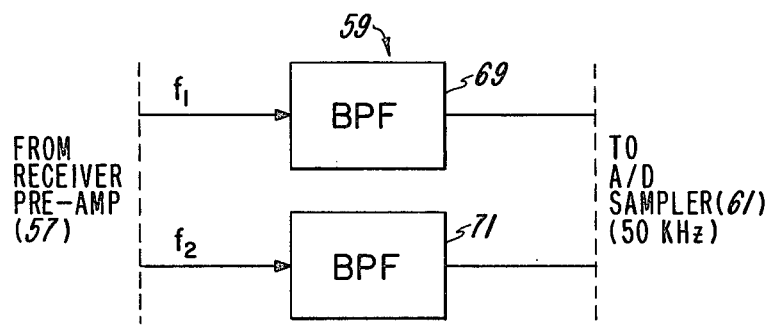
Fig_6

Fig_11

ECHOMETRY DEVICE AND METHOD

FIELD OF THE INVENTION

This invention relates to an echometry device and method and, more particularly, relates to a device and method for remote measurement of temperature utilizing interferometric principles.

BACKGROUND OF THE INVENTION

Measurement of temperature is often important, and sometimes vital, for a particular end. While measurement devices have been fairly well developed for measuring temperatures at the location of the sensing element of the measurement device, remote temperature measuring has not heretofore been achieved, at least to the extent of making available a device and method that is practical, dependable and accurate.

The echosonde (or acoustic sounder) has been heretofore developed and has proved to be useful, particularly in geophysical research. As is known, operation of the echosonde depends upon the physical process of reflection (scattering) of sound by atmospheric or oceanic irregularities or particles. Early work in this area is reported by G. W. Gilman, H. B. Coxhead and F. H. Willis, "Reflection of Sound Signals in the Troposphere", in the Journal of Acoustic Society of America, Vol. 18, pages 274–283 (1946), and a particular form of echosonde is shown and described in U.S. Pat. No. 3,675,191. A complete description of the echosonde may also be found in "Advances in Atmospheric Acoustics" by E. H. Brown and F. F. Hall, Jr., "Review of Geophysics and Space Physics", Vol. 16, pages 47–110 (1978). In addition, an interferometric system for measuring a physical condition such as temperature by sensing medium density is described in U.S. Pat. No. 3,604,252.

However, no form of the echosonde has been found to be successful in providing capabilities for remote measurement of mean temperatures and temperature profiles in the atmosphere or oceans. An attempt has been heretofore made to combine echosonde techniques with interference fringes, but while the combined instrument produced dark bands in echosonde facsimile recordings, the positioning of the dark bands was not considered to be sufficently sensitive to temperature changes for geophysical application (E. H. Brown, C. G. Little and W. M. Wright, "Echosonde Interferometer for Atmospheric Research", Journal of Acoustic Society of America, Vol. 63, pages 694–699 (1978)).

SUMMARY OF THE INVENTION

This invention provides devices and methods for accurate and dependable remote measurement of temperature at predetermined points in a fluid medium, such as the atmosphere or oceans, through the use of propagated waves, such as acoustic or electromagnetic waves, and interferometric principles. Waves are transmitted to form constructive interference fringes and reflected waves received at a receiver from predetermined points in the constructive interference fringes are processed to obtain the mean phase with the analog signal being sampled and the resulting digital signal used to determine temperature changes or absolute temperature at the predetermined points.

It is therefore an object of this invention to provide a device and method for accurate and dependable measurement of temperature.

It is another object of this invention to provide a device and method for accurate and dependable remote measurement of temperature at predetermined points in the atmosphere or oceans.

It is still another object of this invention to provide a device and method for remote measurement of temperature through the use of propagated waves forming constructive interference fringes from which reflected waves are received and processed.

It is still another object of this invention to provide a device and method for remote measurement of temperature which includes determining the mean phase of received signals and sampling the same to form a digital signal which is then utilized to determine temperature therefrom.

It is still another object of this invention to provide an echometer for remote sensing of temperature.

With these and other objects in view, which will become apparent to one skilled in the art as the description proceeds, this invention resides in the novel construction, combination, arrangement of parts and method substantially as hereinafter described, and more praticularly defined by the appended claims, it being understood that such changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 1 is a schematic presentation illustrating the geometry of a single-frequency, single-sided transmitting and receiving system for measurement of relative temperature changes with time for the case of negligible velocity Mach numbers (such as for some oceanic applications).

FIG. 2 is a schematic presentation illustrating the geometry of a single-frequency, symmetry transmitter and receiving system for measurement of relative temperature changes with non-negligible velocity Mach numbers in the atmosphere or ocean;

FIG. 3 is a schematic presentation illustrating the geometry of a multiple-frequency transmitting and receiving system (that may assume either single-sided or symetric forms) for measurement of absolute temperature at specific discrete levels;

FIG. 4 is a block diagram of a transmitting unit useful in this invention;

FIG. 5 is a block diagram of a receiving unit useful in this invention;

FIG. 6 is a block diagram of the analog portion of the receiver shown in block form in FIG. 5 for a single-frequency system such as shown in FIGS. 1 and 2;

DESCRIPTION OF THE INVENTION

Figure 7:
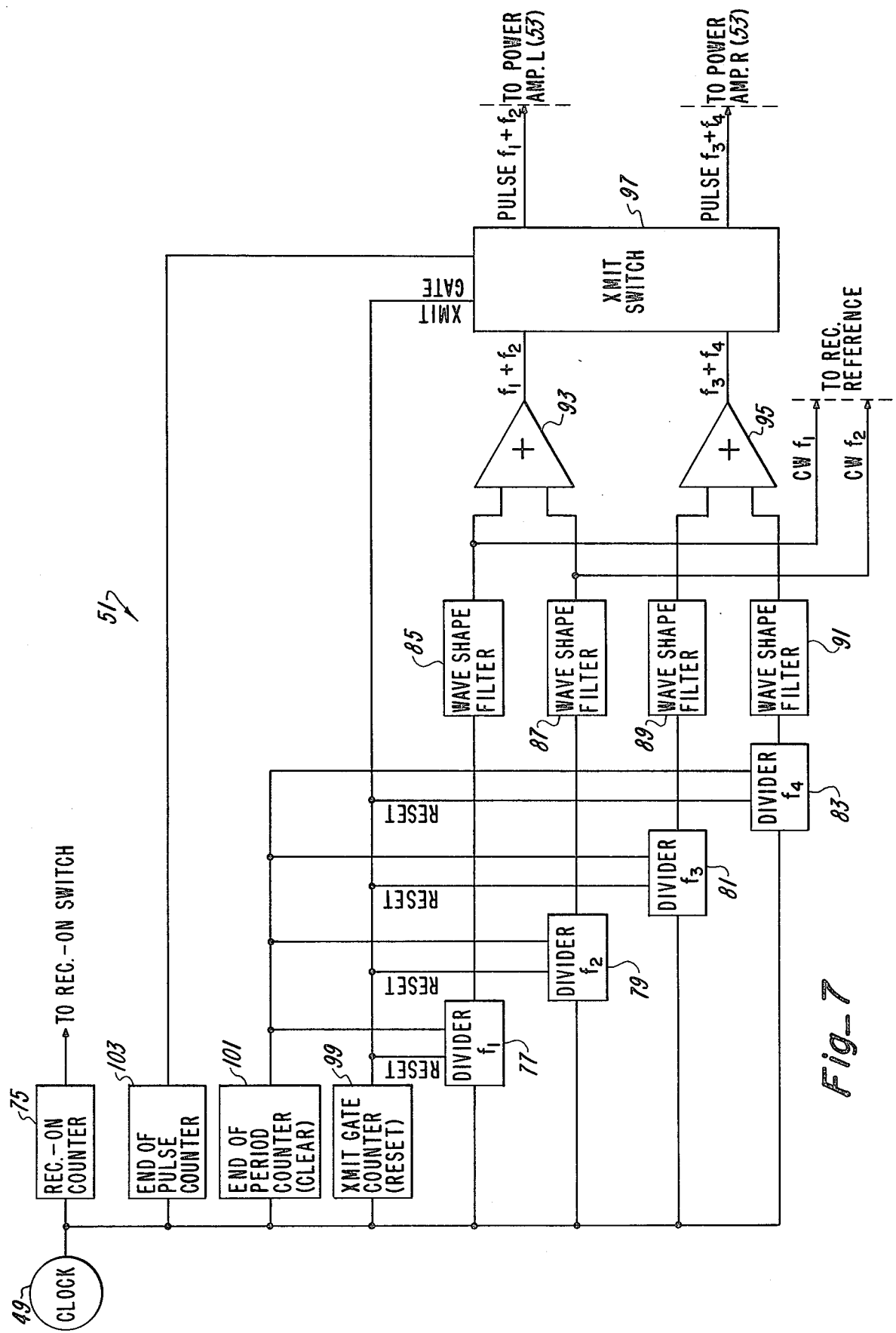
FIG. 7 is an expanded block diagram of the wave shaper of a transmitter such as shown in block form in FIG. 4 for providing four pulses and two continuous wave (CW) signals for enabling determination of absolute temperature.

The echometer of this invention utilizes acoustic or electromagnetic waves and interferometric principles to obtain remote measurements of relative temperatures. Through the addition of known Doppler processing, simultaneous measurement of three-dimensional velocities at the same point in space is made possible, and this enables remote measurement of heat fluxes in the atmosphere or oceans.

The echometer of this invention is similar to the echosonde described hereinabove when acoustics are utilized (except for the receiver circuitry which utilizes mean phase) and the system as shown and described for transmitting and receiving sound waves such as taught with respect to the echosonde described may be utilized in this invention including, particularly, the device as described in "Echosonde Interferometer for Atmospheric Research" by E. H. Brown, C. C. Little and W. M. Wright, Journal of Acoustic Society of America, Vol. 63, pages 694–699 (1978), all of which are hereby specifically included herein by reference.

In obtaining the remote temperature measurements at the receiver, use is made of the mean phase of the scattered wave (i.e., the scattered sound wave where an acoustic system is utilized and a scattered electromagnetic wave where an electromagnetic system is utilized). A method for measuring mean phase, as described herein, includes transmitting pulses of sound from a transmitting array that creates interference fringes, and the sound scattered from turbulent fluctuations produces a corresponding signal in the receiver. The received signal is sampled at a high rate of speed in order to preserve phase information (for a 2 KHz carrier frequency, it has been found that sampling frequencies from 10 KHz to 50 KHz may be utilized). Detailed phase measurements are made during a sampling "window" (typically about one-third of a pulse in length). During fairly stable conditions, the center of the window can be set by the observer, but in rapidly changing conditions, the center of the window varies (in steps equal to an integral number of wave periods) as determined by the variation of the centroid of the pulse envelope.

Phase measurements are then made, with, preferably, the displacements of the zero crossings within the window being measured with respect to those expected to occur in an unmodified wave and the displacements being then averaged over the window to obtain the mean phase of the scattered sound. The displacements are also preferably obtained working both backward and forward in time from the center of the window so that spurious displacements caused by Doppler shifts due to winds at the scattering volume will be cancelled (the additional effects of wind on the phase fronts during their motion along the interference fringes are cancelled by using a symmetric arrangement with simultaneous pulses being transmitted at two different frequencies).

The final measurements are then converted to temperature measurements by comparison with expected values of pulse centroids and mean phase, with the variation of pulse centroid providing a coarse, absolute, path-integrated measure of temperature, and the variation of mean phase providing a fine-scale, relative, path-integrated measure of temperature change.

As indicated in FIG. 1, the echometer can consist, for a single-frequency system, of a transmitting array 15 having a plurality of spaced transducer elements 17 and 18 (or alternately a plurality of spaced transmitters) which transmit propagated waves from each transducer element to provide a normal pattern of interferometric (constructive interference) fringes in the atmosphere or oceans as indicated in FIG. 1. Reflected (or scattered) waves in the constructive interference fringes (designated as 22 and 23 in FIG. 1) are received at a receiver 20 and the received waves processed to provide relative temperature indications.

As indicated in FIG. 2, the echometer can also include, for a single-frequency system, a transmitting array 15 having a left and a right array each of which includes a plurality of spaced transducer elements 25, 26, 27 and 28 (left transmitter) and 30, 31, 32 and 33 (right transmitter). Here again, the reflected (or scattered) waves in the constructive interference fringes (designated as 35 and 36 in FIG. 2) are received at receiver 20 and the received waves processed to provide relative temperature indications.

While a symmetric transmitting array with a plurality of transmitters and a single receiver is shown and described herein, it is to be realized that a single transmitter and a plurality of symmetric receivers could likewise be utilized. In addition, while the axes of the transmitting arrays (i.e., the lines through the centers of a set of transducer elements and perpendicular to the line through the elements) and the receiver beams appear parallel in FIGS. 1 and 2, other angles might advantageously be utilized in some applications.

A multiple-frequency system is indicated in FIG. 3. As shown, transmitting array 15 includes a left array with a pair of transducers 39 and 40 transmitting a pair of outputs at frequencies $f_1$ and $f_2$, and a right array with a pair of transducers 42 and 43 each transmitting a pair of outputs at frequencies $f_3$ and $f_4$. Reflected (or scattered) waves in the constructive interference fringes (designated as 45 in FIG. 3) are received at receiver 20 and processed to provide an absolute temperature readout.

Variation of the ratio of wavelength $\lambda$ to transmitter element spacing d (by variation of either $\lambda$ or d) changes the number of constructive interference fringes brought into play, permits temperature measurements at a number of corresponding levels, and, thus, provides profiles of temperature as a function of altitude (in the atmosphere) or depth (in the ocean). Variation in the distance 1 between receivers and the centers of transmitting arrays controls the maximum vertical range $h_{max}$ for a given ratio $\lambda/d$. Placing the echometer on its side and measuring the horizontal temperature profiles may also have application in special cases, such as for long horizontal distances in the ocean.

A block diagram of a transmitter useful in this invention is shown in FIG. 4 to typically include a clock 49 providing a clock output signal to a wave shaper 51, the output of which is coupled through power amplifier 53 to transmitting array 15. Typical frequencies that may be utilized are 1000 Hz to 2500 Hz for an acoustic system.

A block diagram of a receiver useful in this invention is shown in FIG. 5 to typically include a receiving antenna 20 (which is preferably a beam-forming antenna) the output of which is coupled through a pre-amplifier 57 to a receiver analog portion 59. The analog output signal indicative of the mean phase is then sampled at analog-to-digital sampler 61 and the resulting digital signal coupled to a microprocessor 63 where the temperature is determined and read out at temperature readout 65.

In the single-frequency system, such as shown in FIGS. 1 and 2, a pulse is propogated into the medium (atmosphere or ocean) along one of the constructive interference fringes on one side, and is received at the receiver as a result of scattering within the volume formed by the intersection of the fringe and the receiver beam. The received signal is coupled from pre-amplifier 57 to the receiver analog portion 59, which, as shown in FIG. 6, can include a pair of bandpass filters 69 and 71 which receive the signal and then couple an output to analog-to-digital (A/D) sampler 61.

As indicated in FIG. 6, A/D sampler 61 is a fast A/D circuit (indicated in FIG. 6 to be switched at a 50 KHz rate) so that A/D circuit 61 samples the mean phase of the pulse by measuring zero crossings backward and forward from the center of a "window" chosen in the received pulse (the backward-forward procedure cancels contamination by Doppler shifts). Microprocessor 63 is then able to compute the path-integrated temperature changes associated with the mean phase according to the equations set forth hereinafter.

An integer n specifies the order of a specific constructive interference fringe, with the axis of the transmitting array being assigned the order n=0. In the plane of the echometer, the angle $\theta_n$ between the axis and a fringe of order n satisfies the exact equation:

$$\sin\theta_n = (n\lambda/d)/\sqrt{1 + (n\lambda/2l)^2[(n\lambda/d)^2 - 1]} \quad (1)$$

For n $\lambda/2l << 1$, which holds in most practical cases, a good approximation to Eq. (1) becomes:

$$\sin\theta_n \approx n\lambda/d \quad (2)$$

Using Eq. (2) the total pathlength L taken by a pulse in traveling from the transmitting array to the receiver in a constant refractive index medium satisfies the equation:

$$L = l/\tan(\theta/2); \quad (3)$$

and, defining $t_o = l/c$, the time of travel t of a pulse in a medium with the phase speed c becomes:

$$t = t_o/\tan(\theta/2). \quad (4)$$

Differentiation of Eq. (4), and use of Eq. (2) and the relation $c = \lambda f$, with f the carrier frequency, now provides an approximation to the change in phase velocity $\delta c$ between successive pulses in terms of the change in mean phase $\delta\phi$:

$$\delta\phi/\phi = -(1 + \sec\theta)\delta c/c, \quad (5)$$

where $\phi$ is the total phase pathlength and c is the average mean phase speed. For the particular case of acoustic waves in the atmosphere, Eq. (5) reduces to:

$$\delta\phi/\phi = -(\tfrac{1}{2})(1 + \sec\theta)\delta T/T, \quad (6)$$

where T is the Kelvin temperature. For other cases, constitutive relations for c as a function of fluid parameters provide equivalent formulas. The component of horizontal velocity v in the plane of the echometer produces two effects: a change in wavelength and a rotation in the direction of propagation. Taking both these effects into account provides a similar equation for the phase changes caused by v, that is:

$$\delta\phi/\phi = \pm(v/c)\sec\theta/\tan(\theta/2), \quad (7)$$

where the + sign holds for one side of the symmetric system, and the − sign for the other.

In principle, an inversion technique using Snell's law of refraction and successive approximations should then be able to transform a raw profile of path-integrated temperatures into a true temperature profile. However, the singlefrequency system, in reality, provides only relative temperature changes with time.

In the case of non-negligible horizontal velocities, the symmetric system (as indicated in FIG. 2) transmits a pulse of a single-frequency from one side simultaneously with a pulse of a different single-frequency from the other side. For electromagnetic waves, the two sides can differ in polarization rather than frequency. The average of the two mean phases provides the temperature, and the difference provides the horizontal wind component in the plane of the echometer (note, that the signal contains the usual Doppler information for independent calculation of winds).

Figure 9:
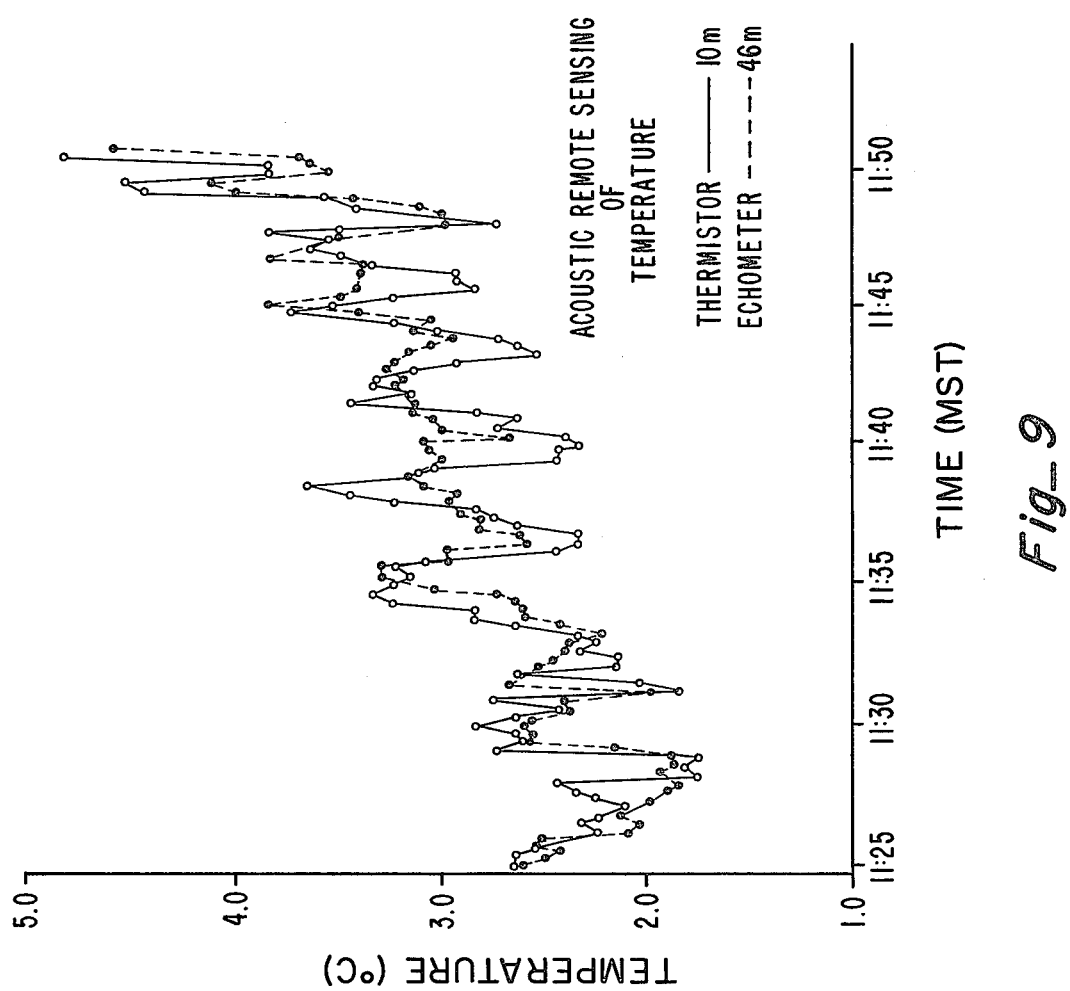
FIGS. 9 and 10 are graphs showing the results of relative temperature measurements utilizing a single-frequency system.
Figure 10:
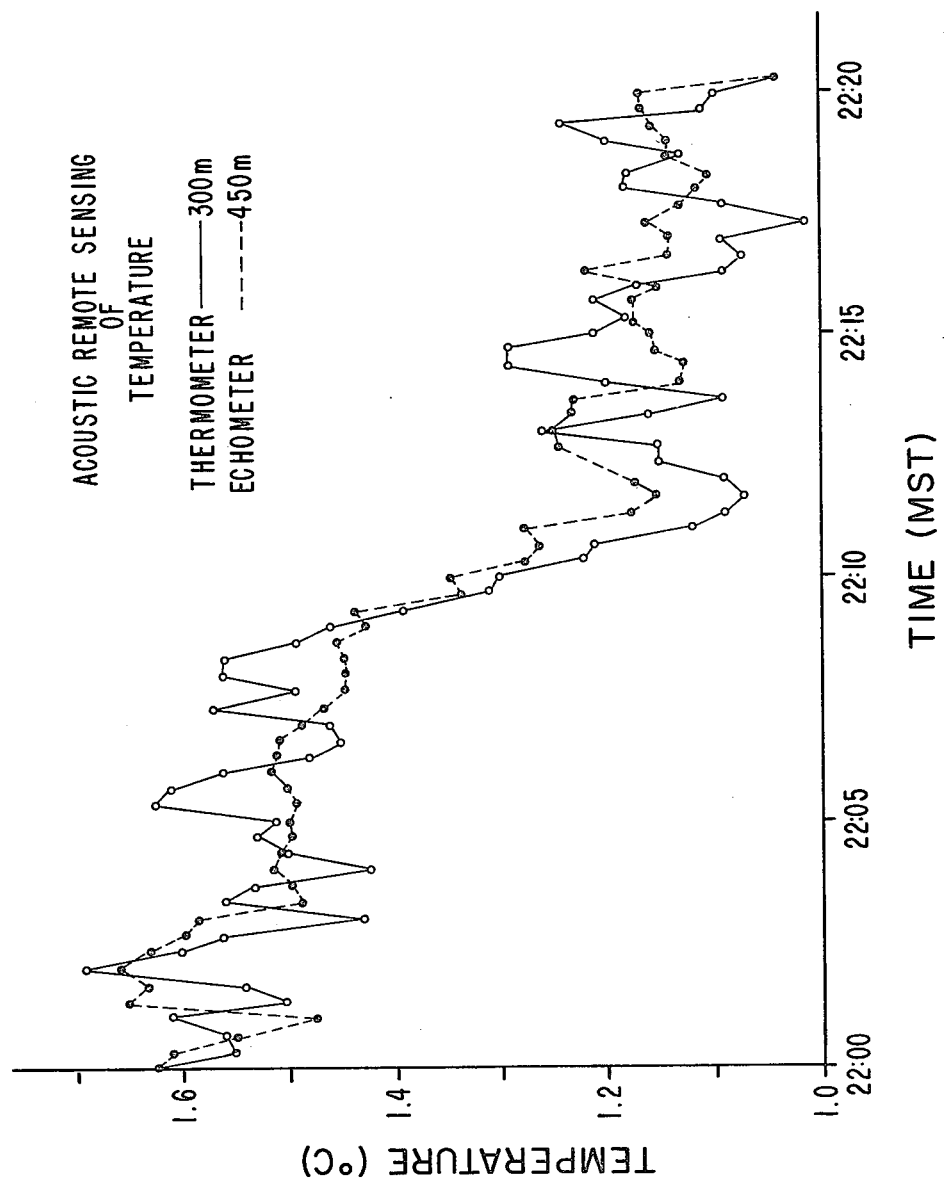

The graphs of FIGS. 9 and 10 show typical results of measurements with a single-frequency system. Since both graphs give only relative temperature changes with time, the beginnings of the data coincide with the comparison data provided by in situ thermometers. FIG. 9 shows a general warming trend during a warm, sunny morning. The series of peaks superimposed on both curves represent a sequence of thermal plumes advected through the instruments by a low horizontal wind of about 1.5 to 2 meters per second. Considering that the comparison curve comes from a thermistor at the top of a 10 meter mast, the agreement appears excellent. FIG. 10 shows a comparison of acoustic measurements of temperatures at about 460 meters altitude with measurements by a thermometer at the top of a 300 meter high meteorological tower located about 350 meters away during a period of late afternoon cooling at higher altitudes. Again, considering the differences in location and altitude, the agreement appears very good.

Figure 8:
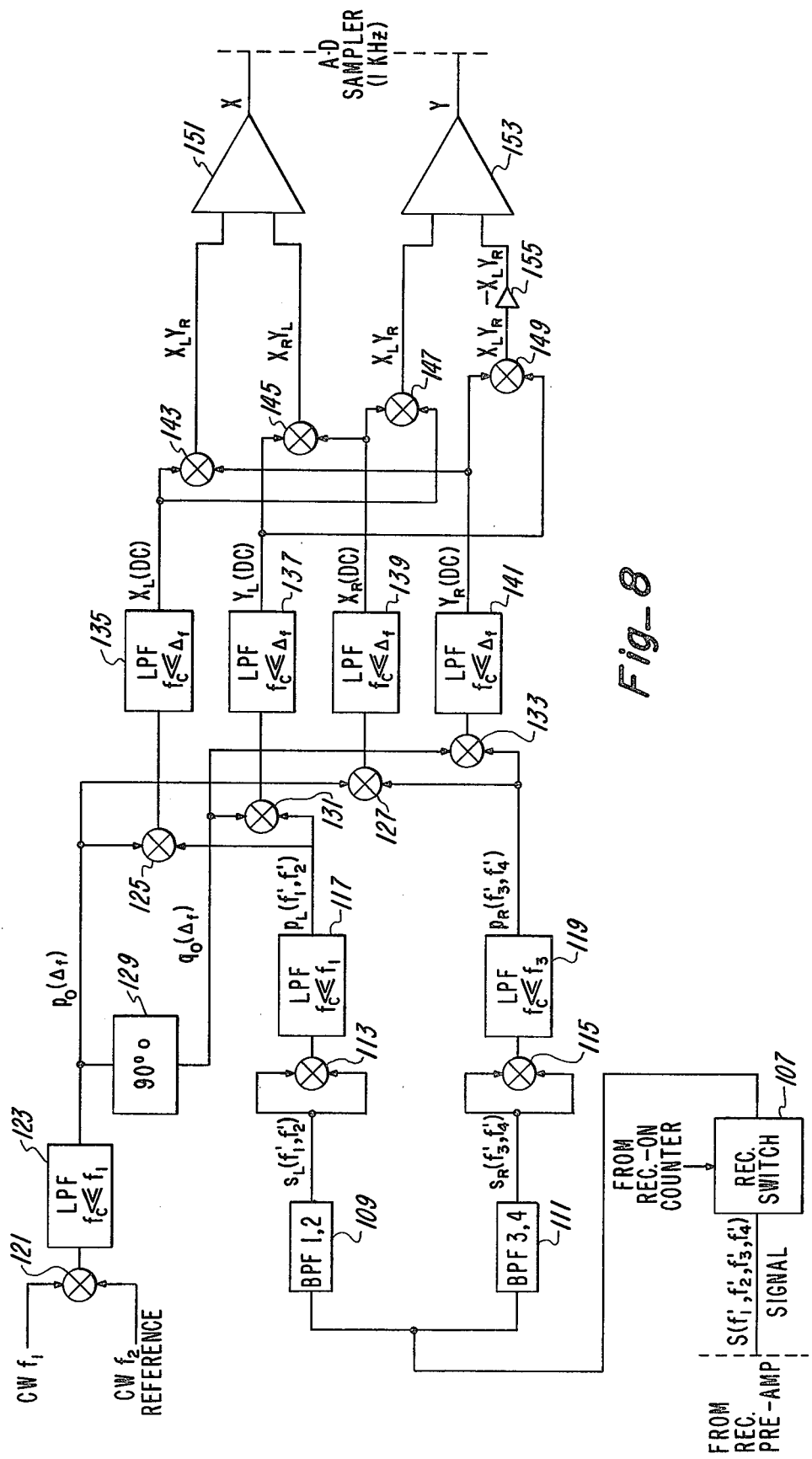
FIG. 8 is an expanded block diagram of the receiver analog portion as shown in block form in FIG. 5.

Single-frequency systems have the disadvantage of providing only relative measurements without the addition of time-consuming computer inversion processes. A multiple-frequency system (as shown in FIGS. 3, 7 and 8) overcomes this disadvantage, and immediately provides absolute temperature measurements at one or more discrete altitudes (or depths). As shown in FIG. 3, simultaneous pulses differing in frequency by a small amount $\Delta f$ propagate from each side. Both pulses follow nearly the same path except for a small inverted vee section at the top of the higher frequency path. Then, by comparison of the difference in mean phase between the two pulses with respect to the difference calculated from measurements of temperature at the surface, a measurement of absolute temperature difference between the surface and the height of the vee is provided.

For acoustic waves in the atmosphere, a symmetric system thus requires four frequencies (for electromagnetic waves this can consist of two frequencies and perpendicular polarizations on each side to simplify the electronics). For the acoustic case, as an example, frequency dividers from a single clock can be utilized to provide the four frequencies with, for example, $f_1$ and $f_2$ being on the "left" side and $f_3$ and $f_4$ being on the "right" side (as indicated in FIG. 3) with the frequencies being chosen to satisfy $f_2-f_1=f_4-f_3=\Delta f>0$, with $f_3-f_1=f_4-f_2=\Delta F>0$, and with $\Delta f<<\Delta F$ ($\Delta F$ is chosen large enough to prevent Doppler contamination of one set of frequencies by the other in a pair of band-pass filters for the received signal).

Wave shaping circuit 51 for the transmitter for providing the necessary transmitted signal in the multiple-frequency system is shown in FIG. 7. As shown, clock 49 provides a clock output to receiver-on counter 75, the output of which is coupled to the receiver-on switch (as shown in FIG. 8). The output from clock 49 is also coupled to $f_1$, $f_2$, $f_3$ and $f_4$ dividers 77, 79, 81 and 83, the outputs of which are coupled through wave shaping filters 85, 87, 89 and 91, respectively, to adding amplifiers 93 ($f_1+f_2$) and 95 ($f_3+f_4$).

The outputs from the adding amplifiers are coupled to transmitter switch 97 which provides the pulsed output ($f_1+f_2$) to the left power amplifier and the pulsed output ($f_3+f_4$) to the right power amplifier. In addition, the continuous wave (CW) reference outputs CWf$_1$ and CWf$_2$ (differing by $\Delta f$) are provided from the outputs of wave shaping filters 85 and 87, respectively.

A transmitter gate counter 99 also receives the clock output from clock 49 to provide a reset signal for dividers 77, 79, 81 and 83 (to assure that all waves begin with a rising zero at the same time), and a transmit signal to transmit switch 97. An end of period counter 101 is also provided to clear dividers 77, 79, 81 and 83, and an end of pulse counter 103 is provided to transmitter switch 97 (both of which counters 101 and 103 receive a clock input from clock 49).

After the scattered signals are received at receiving antenna 20 and coupled to pre-amplifier 57, the signals are coupled to receiver analog portion 59, as indicated in FIG. 8. As shown, the total received signal s(t) is coupled through receiver switch 107 to a pair of bandpass filters 109 and 111, which filters separate the signals into two output signals $s_L(t)$(filter 109) and $s_R(t)$(filter 111). The separated signals thus correspond to the pairs of frequencies transmitted by the left and right transmitters (as shown in FIG. 7).

The output signals from filters 109 and 111 are then coupled through squaring circuits 113 and 115, respectively, to low pass filters 117 and 119, each of which filters has a cut-off frequency $f_c$ with filter 117 satisfying $f_c<<f_1$ and filter 119 satisfying $f_c<<f_3$. This provides two modified signals $P_L(t)$ and $P_R(t)$ that contain DC parts and alternating parts of frequency $\Delta f'$ (where the prime indicates possible Doppler shifts).

The CW input signals (CWf$_1$ and CWf$_2$) are mixed at mixer 121 and coupled through low pass filter 123 to produce a reference wave $p_o(t)$ of exact frequency $\Delta f$ which is coupled to mixers 125 and 127. The reference signal $p_o(t)$ is also coupled through a 90° phase shifter 129 to provide a second quadrature reference wave $q_o(t)$ which is coupled to mixers 131 and 133. As indicated in FIG. 8, the output from low pass filter 117 ($p_L(t)$) is coupled to mixers 125 and 131, while the output from low pass filter 119 ($p_R(t)$) is coupled to mixers 127 and 133.

The four resultants from mixers 125, 127, 131 and 133 are then coupled through low pass filters 135, 137, 139 and 141, respectively, to provide four direct and quadrature signals $X_L(t)$, $Y_L(t)$, $X_R(t)$ and $Y_R(t)$. The outputs from low pass filters 135 and 141 are coupled to mixer 143 to provide an output signal $X_L Y_R$, the outputs from low pass filters 137 and 139 are coupled to mixer 145 to provide an output signal $X_R Y_L$, the outputs from low pass filters 135 and 139 are coupled to mixer 147 to provide an output signal $X_L X_R$, and the outputs from low pass filters 137 and 141 are coupled to mixer 149 to provide an output signal $Y_L Y_R$.

The outputs from mixers from 143 and 145 are coupled to adding amplifier 151 to provide the X output to the A/D sampler, while the outputs from mixers 147 and 149 are coupled to adding amplifier 153 (with the output from mixer 149 being inverted at inverter 155 prior to coupling to adding amplifier 153) to provide the Y output to the A/D sampler.

A/D sampler 61 is indicated in FIG. 8 to be a slow A/D sampler (for acoustic waves in air, about 1 KHz) to sample X and Y and convert the output to the phase $\phi=\frac{1}{2}\arctan(Y/X)$ that would exist for one side of the system alone. If $\phi_o$ represents the phase shift expected over the slightly longer path in the isothermal case, and $\Delta\phi=\phi-\phi_o$, then a given temperature difference $\Delta T$ between the ground temperature T and the temperature at the measurement height h satisfies the first approximation:

$$\Delta\phi/\phi_o = -(\tfrac{1}{2})(1+\sec\theta)\Delta T/T \qquad (8)$$

Note that, although Eq. (8) appears formally the same as Eq. (6), the physical significance is quite different. In Eq. (6), the symbol $\delta T$ indicates a relative change from pulse to pulse, while in Eq. (8), the symbol $\Delta T$ indicates an absolute difference between the ground the the height h at the time of the pulse. In cases of very strong temperature gradients and appreciable refraction, the result given by Eq. (8) can be improved by substituting the first approximation for $T(h)=T+\Delta T$ and the assumed fringe angle $\theta$ into Snell's law to calculate (successively) better values of $\theta(h)$ and $T(h)$.

Figure 11:
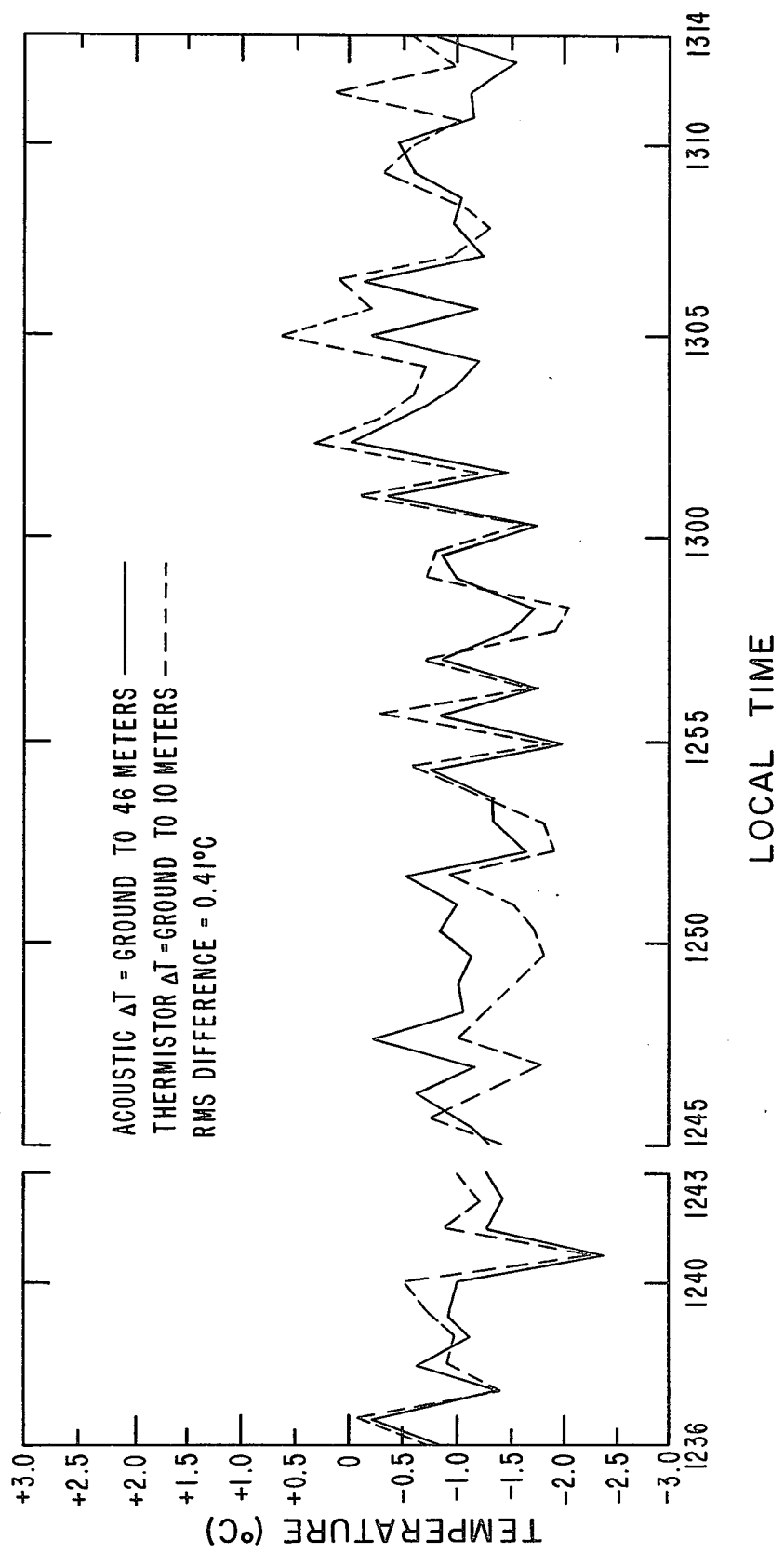
FIGS. 11 and 12 are graphs showing typical results of absolute measurement of temperature utilizing a multiple-frequency system.
Figure 12:
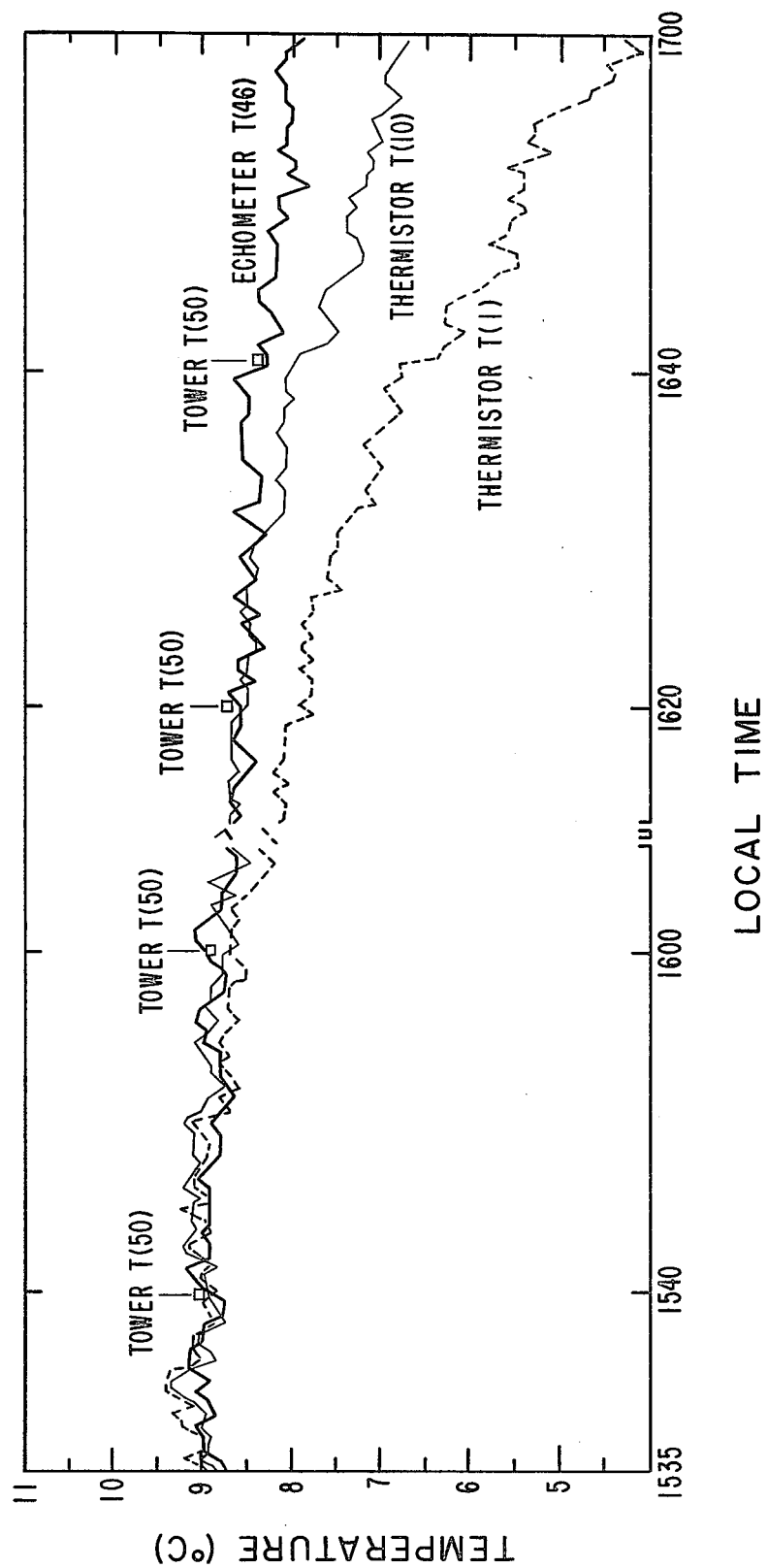

FIGS. 11 and 12 show typical results by graphs of absolute measurements with the multiple-frequency system of of the invention as shown in FIGS. 3, 7 and 8. FIG. 11 compares absolute $\Delta T$'s (measured acoustically) between the ground and a 46 meter altitude with $\Delta T$'s between one and ten meter thermistors. Despite the altitude difference, the two differently measured $\Delta T$'s should be close together in magnitude and behavior since the atmosphere at the time was unstable and sustained only a small temperature gradient. The series of peaks in both represents a sequence of thermal plumes advected through the instruments by the mean wind.

FIG. 12 shows a late afternoon transition between unstable and stable atmospheres and the beginning of the formation of a nocturnal inversion. The absolute acoustic measurements of temperature at 46 meters are compared with thermistors at one and ten meters near the echometer, and with 20 minute averages of a thermometer at the 50 meter level of the meteorological tower located 350 meters away. The changing structure during formation of the inversion is evident—radiation cooling by the surface causes the one meter level to drop off in temperature at about 1600 hours, later the 10 meter thermistor begins to drop off at about 1630 hours, and, finally, the 46 meter acoustic temperature begins to descend, more slowly, and still later, the agreement with the 50-meter tower thermometer is excellent.

From the foregoing, it is to be appreciated that this invention provides a heretofore unavailable device and method for remote temperature measurement.

What is claimed is:

1. An echometer, comprising:
    transmitting means for transmitting a signal in a manner such that constructive interference fringes are created, said signal transmitted by said transmitting means being one of an acoustic and an electromagnetic signal;
    receiving means spaced from said transmitting means for receiving scattered segments of said signal from at least one point of said constructive interference fringes remote from said transmitting means and said receiving means;
    first signal processing means for processing said scattered segments of said signal received at said receiving means, said first signal processing means including mean phase determining means for determining the mean phase of said received scattered segments of said signal and providing an output indicative thereof; and
    second signal processing means for receiving said output indicative of said mean phase and determining therefrom a predetermined temperature characteristic at said remote point.

2. The echometer of claim 1 wherein said transmitting means includes a plurality of transducers arranged in a transmitting array for directionally transmitting said signal, and wherein said receiving means includes a directional antenna for receiving said scattered segments of said signal from said remote point.

3. The echometer of claim 2 wherein said plurality of transducers of said transmitting means includes at least a pair of spaced transducers, and wherein said directional antenna is a beam-forming antenna.

4. The echometer of claim 2 wherein said transmitting means is symmetric and includes a spaced pair of transmitting arrays each of which includes a plurality of transducers, and wherein said receiver is positioned at a point substantially equidistant from each of said transmitting arrays.

5. The echometer of claim 4 wherein signals at a plurality of different frequencies are transmitted by each of said transmitting arrays.

6. The echometer of claim 5 wherein said transmitting means includes wave shaping means connected with said transmitting arrays to provide said signals to be transmitted at said plurality of frequencies.

7. The echometer of claim 6 wherein said wave shaping means causes one of said transmitting arrays to transmit signals at frequencies $f_1$ and $f_2$ and the other of said transmitting arrays to transmit signals at frequencies $f_3$ and $f_4$.

8. The echometer of claim 1 wherein said first signal processing means includes a pre-amplifier, and wherein said mean phase determining means includes an analog receiver portion and an analog-to-digital sampler, and wherein said second signal processing means includes a microprocessor.

9. The echometer of claim 1 wherein said mean phase determining means includes bandpass filter means.

10. A device for remotely measuring temperature, said device comprising:
    transmitting means for transmitting pulses, said transmitting means including a transmitting array having a plurality of transducers for directionally transmitting said pulses in a manner such that constructive interference fringes are formed along the path of said transmitted pulses, said transmitting means including wave shaping means for causing transmission of one of acoustic and electromagnetic pulsed waves;
    antenna means for receiving scattered segments of said transmitted pulses from at least one point of said constructive interference fringes remote from said transmitting means and providing and analog output indicative thereof;
    signal processing means having an analog receiver means and analog-to-digital sampling means, said analog receiver means being connected with said antenna means to receive said analog output therefrom, and said analog-to-digital sampling means being connected with said analog receiver means for sampling said analog signal and providing a digital output signal, said signal processing means determining the mean phase of said received analog output signal; and
    digital signal processing means connected with said analog-to-digital sampling means to receive said digital signal therefrom and responsive thereto determining temperature at said remote point.

11. The device of claim 10 wherein said wave shaping means provides pulses at a single-frequency for transmission by said transmitting arrays, and wherein said digital signal processing means provides an indication of temperature changes at said remote point.

12. The device of claim 10 wherein said wave shaping means provides pulses at a plurality of frequencies for transmission by said transmitting array, wherein said signal processing means provides an output indicative of the mean phase of a predetermined combination of said frequencies, and wherein said digitial signal processing means provides an indication of absolute temperature at said remote point.

13. The device of claim 12 wherein said transmitting array includes a pair of spaced arrays with said antenna means being spaced substantially equidistant from said spaced arrays.

14. The device of claim 13 wherein said transmitting array includes a plurality of transducers for simultaneously transmitting pulses at predetermined different frequencies and wherein said digitial signal processing means determines phase departures with respect to a constant reference index to thereby determine said absolute temperature at said remote point.

15. The device of claim 14 wherein said transmitting array includes a pair of spaced arrays each including a plurality of transducers with one spaced array transmitting pulses at frequencies $f_1$ and $f_2$ and the other transmitting pulses at frequencies $f_3$ and $f_4$.

16. A device for measuring absolute temperature at a remote point, said device comprising:
    transmitting means for transmitting pulses at least two different frequencies from a pair of spaced transmitting arrays, said transmitter frequencies both being one of acoustic and electromagnetic pulses, with said pulses being directionally transmitted in a manner such that constructive interference fringes are created along the paths of said transmitted pulses and such that said paths intersect one another;
    antenna means for receiving scattered pulses from the intersection of said paths of said pulses transmitted by said transmitting arrays and providing an output indicative thereof;

signal processing means including analog receiver means and analog-to-digital sampling means, said analog receiver means being connected to receive said output from said antenna means and providing an analog output indicative thereof, and said analog-to-digital sampling means being connected to receive said analog output from said analog receiver means and providing a digital signal output indicative thereof; and digital signal processing means for receiving said digital signal output from said analog-to-digital sampling means and responsive thereto determining the absolute temperature at said intersection of said paths of said transmitted pulses.

17. The device of claim 16 wherein each of said spaced transmitting arrays simultaneously transmits pulses at two different frequencies, and wherein said antenna means is spaced substantially equidistant from said transmitting arrays to receive said scattered pulses at the intersection of said paths.

18. The device of claim 17 wherein said transmitting means includes wave shaping means for providing pulse outputs at four different frequencies, said pulse outputs being coupled by pairs to said pair of spaced transmitting arrays for transmission.

19. The device of claim 18 wherein said wave shaping means includes timing means, four frequency dividing means connected to said timing means, four wave shaping filter means connected with said frequency dividing means, first and second summing means connected with said wave shaping filter means, and a transmit switch connected with said summing means for providing said pulses to said transmitting arrays.

20. The device of claim 16 wherein said signal processing means includes means to determine the mean phase of said received scattered pulses received at said antenna means.

21. The device of claim 20 wherein said analog receiver means includes input means for receiving said output from said antenna means, bandpass filter means for separating said output into separate channels depending upon the frequency of said transmitted pulses, reference signal means for providing a reference output, mixing means for mixing said reference output with said output on each of said separate channels, and output means for receiving the outputs from said mixing means and providing outputs indicative of the pulses transmitted by each of said transmitting arrays.

22. The device of claim 21 wherein one of said transmitting arrays transmits pulses at frequencies $f_1$ and $f_2$ separated by a frequency difference $\Delta f$ and the other of said transmitting arrays transmits pulses at frequencies $f_3$ and $f_4$ separated by said frequency difference $\Delta f$, with said transmitting array also transmitting a continuous wave reference signal at two frequencies separated by said reference frequency $\Delta f$; wherein said bandpass filter means separates said received pulses into separate channels one of which includes said pulses having frequencies $f_1$ and $f_2$ and the other of which includes said pulses having frequencies $f_3$ and $f_4$; wherein each said channel also includes squaring means and low pass filter means for receiving said output from said bandpass filter means; wherein said analog receiver means includes means for receiving said continuous wave signals transmitted by said transmitting arrays and combining the same so that said continuous wave signals provide said reference signal; wherein said mixing means includes a first plurality of mixers for mixing said reference signal and a 90° phase shifted reference signal with said outputs from said separated channels, low pass filter means connected with said first plurality of mixers, and a second plurality of mixers connected with said low pass filter means; and wherein said output means includes a pair of adding amplifiers connected with said second plurality of mixers to provide said outputs indicative of the pulses transmitted by each of said transmitting arrays.

23. A method for remotely measuring temperature, said method comprising:

transmitting one of an acoustic and an electromagnetic signal in a manner such that constructive interference fringes are created, which fringes extend to at least a point remote from the point of transmission;

receiving, at a point spaced from said point of transmission, scattered segments of the transmitted signal from at least said remote point of said constructive interference fringes;

determining the mean phase of the received scattered segments; and utilizing said determined mean phase to determine a predetermined temperature characteristic at said remote point.

24. The method of claim 23 wherein said signal is transmitted at a single-frequency, and wherein temperature changes are measured at said remote point.

25. The method of claim 24 wherein said signal is transmitted at a single-frequency from two spaced transmitters and is received at a point substantially equidistant from said spaced transmitters.

26. The method of claim 23 wherein said signal is transmitted at a plurality of frequencies, and wherein absolute temperature is measured at said remote point.

27. The method of claim 26 wherein said signal is transmitted at a plurality of frequencies from two spaced transmitters and is received at a point substantially equidistant from said spaced transmitters.

28. The method of claim 27 wherein said method includes transmitting said signal at frequencies $f_1$ and $f_2$ from one of said spaced transmitters, and at frequencies $f_3$ and $f_4$ from the other of said spaced transmitters, with said method also including transmitting a pair of continuous wave reference signals, said frequencies $f_1$ and $f_2$, $f_3$ and $f_4$, and said continuous wave reference signals being separated by a frequency $\Delta f$.

29. The method of claim 28 wherein said method includes receiving scattered segments of each of said transmitted signals and processing the same to provide the mean phase of the signals transmitted from each of said transmitters.

30. The method of claim 29 wherein said processing of said transmitted signals includes sampling the signal to determine from the sampled signal said temperature characteristic.

31. The method of claim 29 wherein processing of said received scattered signals includes separating the signals into channels and mixing the separated signals with said continuous wave reference signals.

32. The method of claim 31 wherein the signals separated at each of said channels is passed through a bandpass filter, squared, and then passed through a low pass filter prior to being mixed with said continuous wave reference signals.

33. The method of claim 32 wherein the mixing of said separated signals with said continuous wave reference signals includes combining said continuous wave reference signals, shifting said combined reference signals by 90°, mixing said separated signals with said combined reference signal and said reference signal shifted by 90°, passing the mixed signals through low pass filters, mixing said outputs from said low pass filters and summing the output from the low pass filters to provide outputs indicative of the transmissions from each of said transmitters.

34. A method for remotely measuring temperatures, said method comprising:
  transmitting pulses from a transmitting array to create interference fringes at a point remote from the point of transmission;
  receiving scattered pulses from said point remote from the point of transmission;
  selecting a window and sampling said pulses within said window;
  measuring the displacements of the zero crossing within said window relative to a reference by measuring displacement in both directions from the center of said window to cancel spurious displacements caused by Doppler shifts, and averaging the same to thereby determine the mean phase of the pulses within said window; and
  utilizing said determined mean phase to determine a predetermined temperature characteristic at said remote point.

35. A method for remotely measuring absolute temperature, said method comprising:
  transmitting pulses at at least two frequencies from a pair of spaced transmitters so that the paths of the transmitted pulses intersect one another at constructive interference fringes remotely positioned with respect to the points of transmission;
  receiving scattered pulses from the intersection of the paths of said transmitted pulses and providing an output reflecting the frequencies of all of said transmitted pulses;
  determining the mean phase of the output with respect to the pulses transmitted; and
  determining from the mean phase the absolute temperature at said intersection of said paths.

36. The method of claim 35 wherein: said pulses are transmitted at frequencies $f_1$ and $f_2$ separated by a frequency $\Delta f$ from one transmitter and at frequencies $f_3$ and $f_4$ separated by said frequency $\Delta f$ from the other transmitter, with said method also including transmitting a pair of continuous wave reference signals separated by said frequency $\Delta f$; wherein said received signals are separated into a first channel having frequencies $f_1$ and $f_2$ and a second channel having frequencies $f_3$ and $f_4$, with said separated signals being then squared, passed through a low pass filter and mixed with said combined reference signal and said combined reference signal 90° phase shifted; and wherein said mixed signals are passed through low pass filters, mixed with one another, and then added to form outputs indicative of the mean phase of said pulses transmitted from each transmitter.

* * * * *